United States Patent [19]

Shang et al.

[11] Patent Number: 4,475,884

[45] Date of Patent: Oct. 9, 1984

[54] REVERSED FLOW FLUIDIZED-BED COMBUSTION APPARATUS

[75] Inventors: Jer-Yu Shang, Fairfax, Va.; Joseph S. Mei; John S. Wilson, both of Morgantown, W. Va.

[73] Assignee: The United States of America as represented by the United States Department of Energy, Washington, D.C.

[21] Appl. No.: 445,598

[22] Filed: Nov. 30, 1982

[51] Int. Cl.³ .................................................. F23D 19/00
[52] U.S. Cl. ........................................... 431/170; 431/7;
   431/328; 432/58; 422/142; 422/145; 422/147;
   110/245
[58] Field of Search ........................... 431/7, 170, 328;
   432/14, 58; 165/104.16; 122/4 D; 422/142, 147,
   145; 110/245, 244, 263, 347; 34/57 A, 59

[56] References Cited

U.S. PATENT DOCUMENTS

| 3,508,506 | 4/1970 | Bishop | 122/4 D |
| 4,247,518 | 1/1981 | Charlet et al. | 422/142 |
| 4,373,454 | 2/1983 | Pitrolo et al. | 431/7 X |
| 4,387,653 | 6/1983 | Voss | 431/7 X |
| 4,419,965 | 12/1983 | Garcia-Mallol et al. | 431/170 X |

FOREIGN PATENT DOCUMENTS 12906 5/1978 Japan .................................. 422/142

*Primary Examiner*—Randall L. Green
*Attorney, Agent, or Firm*—Earl L. Larcher; Stephen D. Hamel; Michael F. Esposito

[57] ABSTRACT

The present invention is directed to a fluidized-bed combustion apparatus provided with a U-shaped combustion zone. A cyclone is disposed in the combustion zone for recycling solid particulate material. The combustion zone configuration and the recycling feature provide relatively long residence times and low freeboard heights to maximize combustion of combustible material, reduce nitrogen oxides, and enhance sulfur oxide reduction.

7 Claims, 2 Drawing Figures

REVERSED FLOW FLUIDIZED-BED COMBUSTION APPARATUS

BACKGROUND OF THE INVENTION

The present invention is directed generally to a fluidized-bed combustion apparatus, and more particularly, to such an apparatus wherein a flow-reversing arrangement considerably improves combustion efficiency.

Of the various types of furnaces or combustors available, those utilizing fluidized-bed combustion techniques are of higher efficiency. In a typical fluidized-bed combustion apparatus particulate fuel such as coal or another combustible material is introduced into the combustion chamber and fluidized by a combustion-supporting medium passed through an underlying distributor plate or grid. Volatile gases and combustible particulate material evolved from the fluidized bed flow upwardly into a freeboard area overlying the fluidized bed where the combustion of the gaseous volatiles and the combustible particulate material continues until substantially all combustible material is consumed. Another advantage particular to fluidized-bed combustion is that the production of environmental pollutants such as sulfur oxides and various forms of nitrogen oxides is considerably reduced over that generated in other types of combustion apparatus.

While fluidized-bed combustors provide an advancement over the prior art combustor constructions, there are some shortcomings which detract from the overall efficiency of the fluidized-bed combustion techniques. For example, combustion efficiency is reduced due to the loss of combustibles in the spent bed material and the flue gas in the forms of unburned coal chars, carbon monoxide, and the like. Also, in conventional fluidized-bed combustors relatively high freeboard construction is required for attaining the desired combustion efficiency since both an adequate residence time and high temperatures are required in the freeboard volume to effect the combustion of the particulate material driven into the freeboard from the fluidized bed. The lack of a sufficient residence time and a sufficiently high freeboard temperature have been found to be major causes for losses in combustion efficiency which are primarily due to the non-combustion of the carbon-bearing particulate material driven into the freeboard. To provide the desired residence time the freeboard height was increased but even with good insulation techniques the temperature range with higher freeboards was hard to maintain at a sufficiently high level for the combustion of carbon-bearing fine particulate material in the freeboard. Further, the temperatures required in the freeboard area to effect the reduction of the various nitrogen oxides were difficult to maintain. In fact, in a fluidized-bed combustion operation the major heat source is from the burning of the fluidized-bed material which is located a considerable distance from the uppermost portion of the freeboard. Also, the shielding action by the solid particles and the gaseous products of combustion in the freeboard contribute significantly to the lack of control of the freeboard temperature so as to decrease the efficiency of the fluidized-bed combustion apparatus.

SUMMARY OF THE INVENTION

It is a primary objective or aim of the present invention to provide a fluidized-bed combustion apparatus in which the freeboard height is considerably less than that previously required of fluidized-bed combustors. In accordance with the present invention, the residence time, the high freeboard temperature and the enhanced turbulence within the freeboard area are maintained at sufficient values so as to significantly reduce the combustibles in the freeboard volume so as to effectively increase the efficiency of the present system over fluidized-bed combustors as previously known. Generally, the fluidized-bed combustion apparatus of the present invention comprises a housing in which a perforated grid means is disposed for providing upper and lower chambers. Inlet means are provided in the housing for introducing a fluidizing and combustion-supporting medium into the lower chamber from which it is distributed through the grid to fluidize solid particulate material within the upper chamber. A vertically oriented partition means is so disposed in the upper chamber as to define a generally U-shaped combustion zone. Inlet and outlet means are provided on opposite sides of the partition for respectively introducing solid particulate material into the combustion zone and for discharging spent material from the combustion zone. A particulate material and gas separating means is disposed and arranged in the combustion zone so as to receive gas and particulate material from a portion of the combustion zone on one side of the partition means near the outlet means, separate the particulate material from the gas, convey the particulate material into another portion of the combustion zone on the opposite side of the partition means, and discharge essentially particulate-free gas from the combustion zone.

With the subject combustion apparatus the height of the freeboard can be significantly less than in known fluidized-bed combustors since the combustible fines contained in the freeboard volume are recycled back into the combustion zone to assure that the combustion of the combustible material can be essentially fully achieved before the spent particulate material is discharged from the combustion zone. Also, by recycling the particulate material, the residence time and high freeboard temperatures can be maintained at sufficient values for considerably enhancing the combustion efficiency as well as controlling the emission of environmental pollutants.

Other and further objects of the invention will be obvious upon an understanding of the illustrative embodiment about to be described or will be indicated in the appended claims, and various advantages not referred to herein will occur to one skilled in the art upon employment of the invention in practice.

Figure 2:
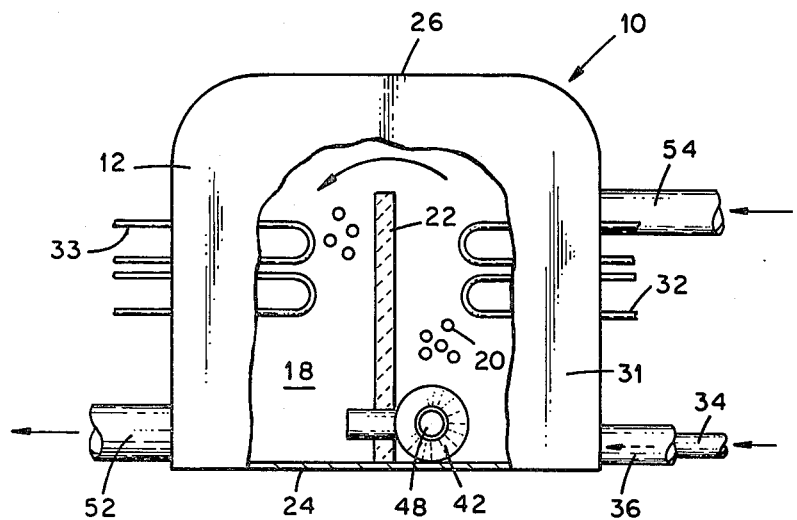
FIG. 2 is a top plan view, partly broken away of the FIG. 1 embodiment showing further details of the fluidized-bed combustion apparatus of the present invention.
Figure 1:
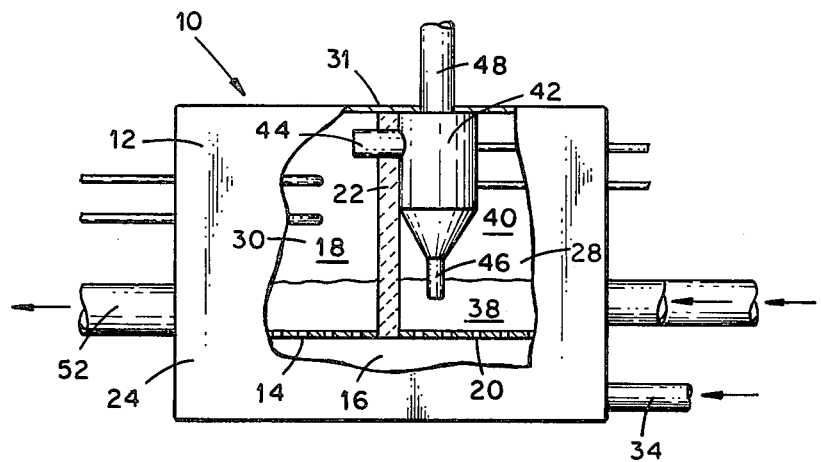
FIG. 1 is a side view, partly broken away of the fluidized-bed combustion apparatus of the present invention.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

With reference to the accompanying drawing, the fluidized-bed combustor or boiler of the present invention is generally shown at 10 and comprises an enclosed housing 12 which may be of a round configuration or have rounded end walls (as shown) to facilitate the flow of the fluidized-bed material as will be described in detail below. Within the housing 12, a distributor or grid 14 is horizontally disposed to divide the housing into a lower plenum chamber 16 and an upper combustion chamber or zone 18. The grid 14 is provided with throughgoing nozzles or passageways 20 which may be suitably canted so as to displace or facilitate the movement of the fluidized-bed material from the fuel inlet to the spent material discharge about the U-shaped combustion zone. Alternatively, the grid 41 may be slanted up to about 4° from the inlet to the discharge to facilitate this movement of the bed material. The bed solid movement can also be controlled by the difference in bed densities created by the difference in fluidization velocity at various parts of the bed. This is done by the partition of the plenum chamber.

A vertically oriented fire wall or partition 22 is disposed within the combustion zone 18 and extends from a housing sidewall 24 to a location inwardly spaced from the opposite housing sidewall 26 to form a U-shaped combustion zone defined by combustion areas or compartments 28 and 30 coupled by a bight between the end of the partition 22 and housing sidewall 26. The partition 22 is shown extending from the grid 14 to the roof or top wall 31 of the housing 12 so as to enclose the combustion zone except for the passageway or bight defined by the end of the partition 22 and sidewall 26. The partition 22 may be provided with suitable conduits therein (not shown) for conveying a coolant or the like for simultaneously cooling the partition 22 while generating steam for external use. Additional heat exchange coils may be disposed in the walls of the housing or extend into the freeboard area of the combustion zone 18 as shown generally at 32 and 33 for the purpose of extracting energy from the combustion of the particulate material within the combustor 12.

The fluidizing and combustion-supporting medium, e.g., air, is introduced into the plenum chamber 16 through an inlet conduit 34 which extends into the plenum chamber 16 at any suitable location. The distribution of the air through the passageways 20 simultaneously fluidizes and supports combustion of combustible solid particulate material introduced into the compartment 28 of the combustion zone 18 near the housing sidewall 24 by inlet conduit 36. The fluidization of the particulate material such as coal, peat, and other known combustible materials used in fluidized bed combustors forms a fluidized bed 38 which is ignited in any conventional manner to effect the combustion of the combustible material contained within the bed. During this combustion, particulate material is driven from the fluidized bed 38 into the freeboard 40 overlying the bed 38. The freeboard 40 also contains considerable quantities of volatile gases such as carbon monoxide, hydrogen, methanes and the like. During the operation of the fluidized bed, the gases and solid material are constantly combusted while being stirred within the freeboard area and being displaced from a location in the combustion zone 18 near the inlet 36 through compartment 28 and into compartment 30 along a U-shaped path.

In accordance with the present invention, the combustible particulate material contained within the freeboard area and the flue gases are pulled into a gas-particle separating mechanism such as a cyclone 42 which is supported by the fire wall or partition 22 and disposed in compartment 28. The inlet conduit 44 for the cyclone 42 is disposed at the upper end of the freeboard near the housing wall 24 so as to assure maximum travel of the particulate material in the combustion zone 18 before it is drawn into the cyclone 42. The particulate material and gases entering the cyclone 42 through the conduit 44 are separated within the cyclone 42 and the particulate material is returned into the combustion zone compartment 28 through the dip leg 46 of the cyclone 42. This recycling of the particulate material in the combustion zone 18 assures that maximum combustion of combustibles contained in or forming the particulate material will be consumed prior to exhausting the particulate material from the combustion chamber 18. As shown, the dip leg 46 of the cyclone extends into the fluidized bed 38 in the compartment 28 near the housing sidewall 24. The cyclone 42 is also provided with a flue gas discharge conduit 48 which extends through the roof 31 of the housing 12. This discharge stream of flue gas is essentially devoid of any particulate material which will minimize cleanup procedures required for meeting environmental standards.

The solids forming the fluidized bed, when spent, are discharged from the combustion zone 18 through an outlet conduit 52 which is in registry with the combustion zone 18 near the grid 14 in compartment 30.

In addition to the particulate material used within the combustion zone for generation of heat energy, particulate limestone, dolomite, or the like is introduced through conduit 54 at a location downstream of the fuel inlet 36. This limestone is utilized for the capture or sorption of sulfur in the combustion zone and also provides hot surfaces for assisting in the combustion of the particulate material within the combustion chamber.

The long residence time and high freeboard temperatures achieved by the apparatus of the present invention provides sufficient turbulence and temperature control so that the complete carbon burnup may be achieved within the freeboard area. Thus, the spent particulate material discharged from the combustion zone through conduit 52 is essentially devoid of any combustible substances. The reduction of the oxides of nitrogen is catalyzed by the presence of solid surfaces in the fluidized bed within the combustion zone. The forced increase in the residence time achieved by the recycling of particulate material and the high freeboard temperatures will considerably aid in the reduction of these oxides. Further, the cyclone will also grind the sulfur sorbents to a degree of fineness until these fines can no longer be captured in a cyclone and recycled. This continued attrition of the sorbents will also renew the limestone for presenting additional surface area for enhancing sulfur retention. The relative absence of any appreciable backmixing of the bed material as normally encountered in conventional fluidized-bed combustors keeps the carbon loading in the spent bed material to a minimum.

It will be seen that the present invention provides a substantial improvement in fluidized-bed combustors and boilers wherein the combustion efficiency is substantially improved over previously available combustors due to the continuous recycling of combustible particulate material in the combustion zone. The present arrangement assures that any loss in the combustion efficiency due to the discharging of combustibles in the spent material is minimal and that flue gas containing unburned coal chars, hydrocarbons and carbon monoxide is virtually nonexistent. Further, the cost required for constructing the boiler of the present invention is considerably less than heretofore encountered due to the freeboard height requirements.

What is claimed is:

1. A fluidized-bed combustion apparatus comprising:
    a housing;
    perforated grid means disposed in said housing for providing an upper chamber and a lower plenum chamber;
    inlet means for conveying a fluidizing and combustion supporting medium into the plenum chamber for passage through the perforated grid means into the upper chamber;
    vertically oriented partition means disposed in said upper chamber and extending from a sidewall of said housing and terminating at a location adjacent to an oppositely disposed sidewall of said housing to provide a passageway between said oppositely disposed sidewall and the partition means for defining a horizontal generally U-shaped fluidized-bed combustion zone;
    inlet and outlet means for respectively introducing solid combustible particulate material into the combustion zone and for discharging spent material from the combustion zone and with said inlet and outlet means being disposed on opposite sides of the partition means;
    solid particulate material and gas separating means disposed in said upper chamber and arranged to receive gas and combustible particulate material from a portion of the combustion zone on one side of said partition means near the outlet means and convey the particulate material when separated into another portion of the combustion zone on the opposite side of the partition means; and
    discharge conduit means penetrating said housing and coupled to said separating means for receiving essentially particulate-free gas from the combustion zone.

2. A fluidized-bed combustion apparatus as claimed in claim 1, wherein said inlet and outlet means are inlet and outlet conduits in registry with the combustion zone near the first mentioned sidewall and in close proximity to said grid means.

3. A fluidized-bed combustion apparatus as claimed in claim 2, wherein a further inlet means is in registry with the combustion zone at a location intermediate the inlet conduit and said oppositely disposed sidewall for conveying particulate sulfur sorbing material into said combustion zone, wherein said separating means receive particulate sulfur sorbing material along with said combustible particulate material, and wherein sulfur sorbing particulate material is conveyed along with said combustible particulate material into said another portion of the combustion zone.

4. A fluidize-bed combustion apparatus as claimed in claim 2, wherein said separating means has a gas and solid particulate inlet thereinto in registry with the uppermost volume of the combustion zone defining the freeboard of the combustion zone for receiving the gas and particulate material from said combustion zone, said gas and solid particle inlet being disposed in close proximity to the first mentioned sidewall and said partition means.

5. A fluidized-bed combustion apparatus as claimed in claim 4, wherein said separating means has a particulate discharge terminating in close proximity to said grid means at a location near the first mentioned sidewall.

6. A fluidized-bed combustion apparatus comprising:
    an enclosed housing,
    perforated grid means disposed in said housing for defining upper and lower chambers;
    vertically disposed partition means projecting between said grid means and the top enclosure of the housing for dividing the upper chamber into side-by-side compartments, said partition extending from one sidewall towards the opposite sidewall of the housing and terminating at a location angularly spaced therefrom for defining a passageway joining said compartments;
    conduit means penetrating said housing and in registry with said lower chamber for conveying a fluidizing medium into the latter for subsequent distribution into said upper chamber through the perforated grid means;
    further conduit means penetrating said housing and in registry with one of said compartments at a location adjacent said one sidewall for conveying particulate fluidizable material into said one compartment;
    still further conduit means penetrating said housing and in registry with the other of said compartments at a location adjacent said one sidewall for discharging spent particulate material from the other of said compartments;
    cyclone means disposed in said one compartment at a location adjacent said one sidewall and having an inlet thereinto projecting through said partition means into the other of said compartments at a location adjacent said top enclosure for receiving and conveying particulate material and gases into said cyclone means;
    first discharge conduit means in registry with said cyclone means and disposed in said one compartment for discharging particulate material from the cyclone means into said one compartment means at a location adjacent said grid means and said one sidewall; and
    second discharge means in registry with said cyclone means and extending through said top enclosure for discharging gases from said cyclone means and said combustion zone.

7. A fluidized-bed combustion apparatus as claimed in claim 6, wherein another conduit means is in registry with said one compartment at a location intermediate said further conduit means and said opposite sidewall for conveying particulate sulfur sorbant material into said combustion zone.

* * * * *